Sept. 30, 1924.
A. H. BERNTSON
EAR TAG
Filed April 18, 1922   2 Sheets-Sheet 1
1,510,083
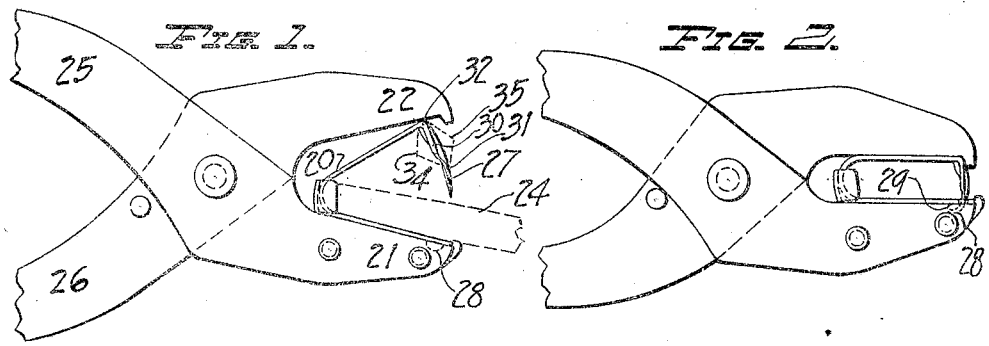
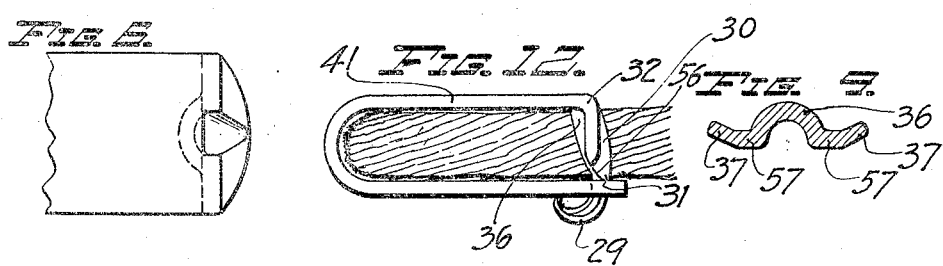
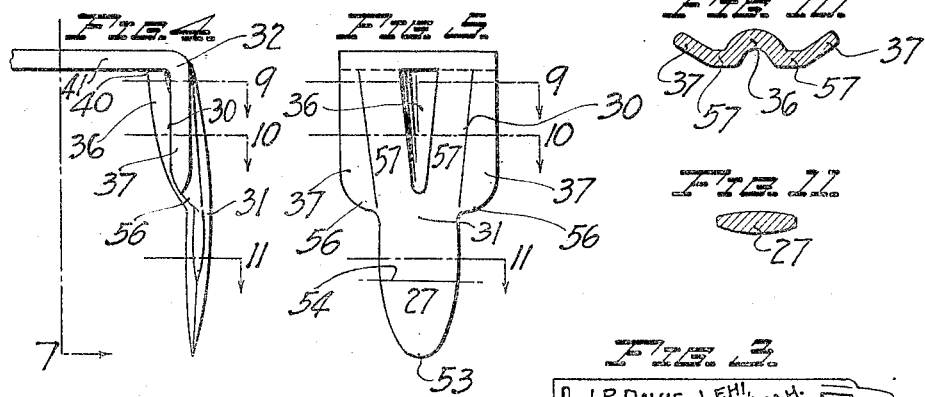
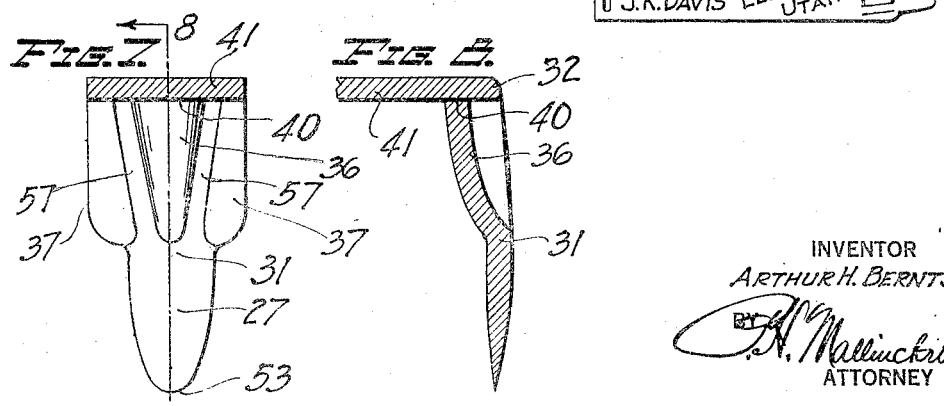
INVENTOR
ARTHUR H. BERNTSON,
ATTORNEY Sept. 30, 1924.
A. H. BERNTSON
EAR TAG
1,510,083
Filed April 18, 1922    2 Sheets-Sheet 2
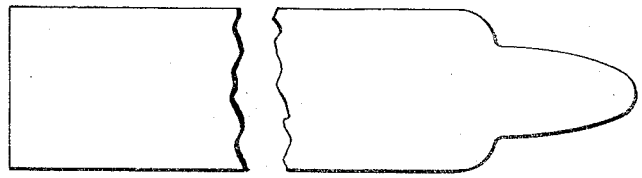
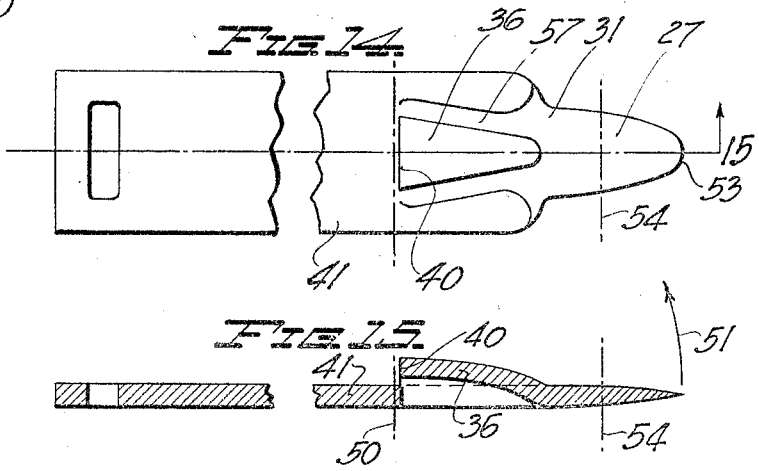
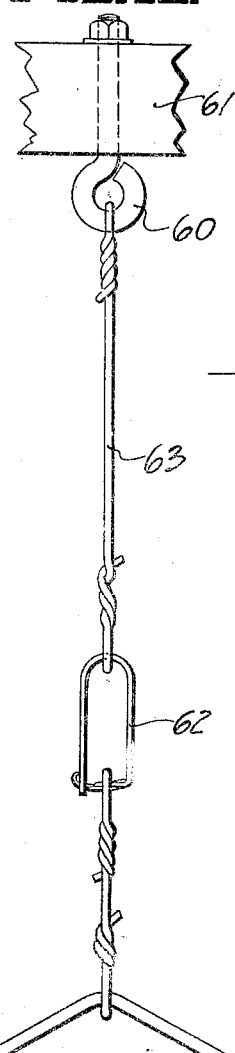
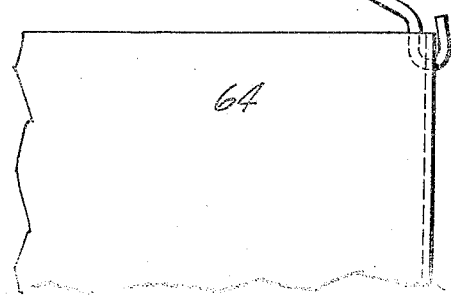

Patented Sept. 30, 1924.

1,510,083

UNITED STATES PATENT OFFICE.

ARTHUR H. BERNTSON, OF SALT LAKE CITY, UTAH.

EAR TAG.

Application filed April 18, 1922. Serial No. 555,473.

*To all whom it may concern:*

Be it known that I, ARTHUR H. BERNTSON, a citizen of the United States, and a resident of Salt Lake City, county of Salt Lake, and State of Utah, have invented a certain new and Improved Ear Tag, of which the following, together with the accompanying drawing, forms a full, clear, and exact specification, such as will enable others skilled in the art to which it appertains to make and use the same.

This invention relates to ear tags, which are used for marking and identifying sheep, cattle and other animals, and its principal objects are:

First. To so construct the ear tag that it shall have great strength.

Second. Have great resistance to opening-out and thus becoming detached from the ear of the animal to which it may be applied.

Third. Be simple in construction and thus adapted for economical manufacture.

Fourth. Be easily and quickly applied, and positive in its clinching and holding properties.

In recent years, the use of metallic bands usually made of aluminum, have come into vogue for the purpose of identifying cattle, sheep and other animals which generally feed on open ranges, and thus are subject to loss from the fact that animals belonging to herds of different owners become mixed; also animals often stray away from the herds to which they belong.

For the purpose of identification, metallic bands, having one end pointed and the other end provided with an eyelet through which the point may be projected and clinched, are attached to the ears of the animals, the point being adapted to pierce the ear before the point passes through the eyelet. The pointed portion of an ear tag may be called its "tongue". Usually the ear tags are applied by means of so-called tongs or pliers of special designs, by which the user may at one operation pierce the ear of the animal and clinch the point of the tag.

I am fully aware that the idea of applying a metal band as above explained, is not new, so that my invention is largely confined to overcoming certain weak points which have been found by actual use, to exist in the ear tags which are on the market at the present time. The most serious objection to most of the existing tags is the weakness of the tongues, the latter often bending over or becoming kinked before the ears are pierced. Even in cases where the ears are properly pierced and the tongues of the tags clinched, unless the clinched portions are of considerable strength, the tags become easily detached from the ears when the animals are herded together and come in contact with each other, or when the animals rub their heads against trees, posts, buildings and the like.

In attaining the objects of my invention, I provide the usual flat band with a tongue at one end and an eyelet through which the tip of the tongue may be clinched, at the other end. In the shape in which ear tags are usually supplied to the users, the portion on which the tongue is formed, is bent at right angles to the body of the tag and may be called the tongue "base". Near its middle, in the direction of its length, the band is brought around in a U-bend in such a way that the eyelet end of the band may be closed over the tongue, and the tongue be clinched to hold the band securely in the shape of a closed link. In applying the ban, it is placed in the tongs, and slipped over the side of the ear of the animal; then in closing the band to form the link, the sharp tip of the tongue pierces the ear just before the clinching takes place. It will readily be seen that there is considerable stress on the tongue and on the base in piercing the ear, and later in holding the link tightly closed on the ear. In shaping the tongue of my improved tag, I prefer to make it as broad as possible for strength, but still somewhat less in width than the band proper, so it may pass freely through the eyelet. The tip of the tongue may be rounded and sharpened to a cutting edge, and the cutting edge may be extended down on each side of the tongue to a suitable distance below the tip.

As the tongue is narrower than the band proper, shoulders or abutments are formed on each side of the root of the tongue; against these abutments the eyelet part of the band is adapted to bear when it is forced home by the clinching of the tongue tip. The corners of the abutments may be rounded off, and these, with the abutments themselves formed into cutting edges which come into use as soon as the broad portion of the band contacts the surface of the ear. The cutting portions of the tongue and the abutments must be backed up by a structurally strong base, and this strength I secure by forming an angular wing portion on each side of the tongue base, and even more specially by forming the central portion of the tongue base into a buttress or rib. The bottom of the buttress then bears against the straight portion of the band which stands at right angles to the base and thus gives a remarkably strong construction, affording all the needed resistance required to support the cutting edges of the tag when these are forced through the tough substance of an animal's ear.

The novel features of my invention, for which the protection of Letters Patent is desired, are collectively grouped in the claims concluding this specification.

In the drawings,

Fig. 1 is a side elevation showing my improved tag held in the jaws of the tongs ready for application to the ear. This figure illustrates the actual size of the tag as made for sheep and other comparatively small animals.

Fig. 2, a similar view showing the tongs closed, with the tag in the final, clinched position on the ear.

Fig. 3, a plan view of the ear tag in flat form, before it is shaped for placing in the tongs as shown in Fig. 1.

Fig. 4, an enlarged side elevation of my invention.

Fig. 5, an enlarged front elevation thereof.

Fig. 6, an enlarged top plan view of the same.

Fig. 7, a section on line 7, Fig. 4.

Fig. 8, a section on line 8, Fig. 7.

Figs. 9, 10 and 11, sections on lines 9, 10 and 11 in Figs. 4 and 5.

Fig. 12, a section through a portion of an animal's ear showing the tag in position thereon; this is drawn to a scale somewhat larger than the actual size usually placed on cattle.

Figs. 13 and 14, enlarged detailed views, partly broken, illustrating steps in the manufacture of this tag.

Fig. 15, a section on line 15 in Fig. 14, and

Fig. 16, an elevation illustrating a method which I have devised for testing the strength of ear tags generally.

Referring to the drawings, 20, Fig. 1, represents the finished tag in the shape in which it is supplied to the user, who places it in the jaws of the tongs 21 and 22 for applying to the ear 24 of an animal. The tongs may be of a special design such as forms the subject of my separate application for patent bearing even date herewith.

The jaws of the tongs are compressed by closing the handles 25 and 26 with the final result illustrated in Fig. 2. In closing the tongs, the tongue 27 of the tag is first forced through the flesh of the ear, and as the tongue emerges therefrom, it enters the curved recess 28 in the lower jaw of the tongs (Figs. 1 and 2) where the further closing of the jaws causes the tongue to curl up into the clinched form shown at 29 in Figs. 2, 12 and 16. This curling up of the tongue is common to various ear tags of the present type and therefore forms no part of my invention. In order to effect the proper clinching however, the tag must be very strong in the base 30 between the root 31 of the tongue and the bend 32, as shown in Fig. 1. The purpose of the present invention is directed to supply the needed strength in the base 30, by forming reinforcements in a way which shall preferably not encroach on the thickness of the metal of which the tag is made. Unless the tongue itself is made sturdy, and this sturdiness backed up by proper reinforcing in the base 30, a considerable percentage of the ear tags are buckled or kinked to one side or the other, between the root 31 and the bend 32, somewhat after the manner illustrated by the dotted lines shown at 34 or 35 in Fig. 1, during the process of fastening, thus resulting in a loss not only in the cost of the ear tags, but also in the time of the persons employed in the task of fastening the same. In actual practice the loss and annoyance from this source is found to be considerable.

As clearly shown in Figs. 4 to 11, the reinforced tongue-base of my improved tag may consist of the centrally located rib or buttress 36 with the integral web portions 57 on either side of the buttress, and the integral wings 37, the buttress being preferably intermediate the wings 37. The buttress and the wings extend preferably from the root 31 of the tongue 27 to the bend 32 (Figs. 4, 5 and 7), the bottom 40 of the buttress bearing squarely against the inner surface of the main body part 41 of the ear tag. These reinforcements are very readily formed without perceptibly lessening at any point, the thickness of the flat metal band of which the ear tags are usually made. The ease of manufacture of the present invention is shown in Figs. 13, 14 and 15, where the first step consists in blanking the shape shown in Fig. 13, from any suitable flat stock, preferably from what is known as strip metal. This shape is struck from the dies at one pass, and only one additional pass, though a second set of dies is necessary to finish the strip in the final shape indicated in Figs. 14 and 15. The tags may then be shaped for placing in the tongs, as shown in Fig. 1.

In shaping, the front portion of the tag is bent up at, approximately, the line 50 (Figs. 14 and 15) in the direction of the arrow 51 until the sides of the tongue base make approximately a right angle with the body portion 52. This allows the bottom face 40 of the buttress 36 to contact the inner surface of the body 41, thus securing the bearing previously referred to.

The sharp cutting edge required for the tongue extends from the tip 53 around on each side of the tongue to points lying approximately in the line 54, Figs. 5 and 14. The abutments 56 may also be sharpened to form the cutting edges at the top of wings 37.

The buttress may have any suitable shape though the one illustrated in the drawings, which has the approximate form of the half of a hollow cone, is preferred. This form, starting near the root of the tongue, gradually increases from zero, in the plane of the tongue, to the maximum projection above the said plane, at the bottom of the buttress.

One of the purposes in this invention is to provide a form where the thickness and width of the tag portions, which penetrate the flesh of the ear, shall be in the form of a gradually tapering wedge without any blunt projections which would bruise the flesh.

It will be noticed that the tongue portion (Fig. 11) has approximately an elliptical cross-section which permits the tongue to be made of maximum thickness through the center longitudinally, and as no channels or other depressions are cut into the maximum thickness of the metal, great strength is secured.

In order to satisfy myself of the utility of my invention, I have made a number of tests on the strength of the tag defined by this specification, in comparison with the strengths of two other tags which are in the market. To this end, specimens of the two other tags were purchased at random, and the three lots of tags subjected to similar conditions in testing. The method of testing the tags is illustrated in Fig. 16, where the eye-bolt 60 is attached to a stationary support 61, and an ear tag 62 is suspended therefrom, by a wire 63 having a loop at each end. A receptacle 64 was suspended from the ear tag as shown, and into this receptacle, small pieces of iron or other metals were dropped until a weight sufficient to stress the tag to destruction was reached. Below, I give the results of the tests on six separate specimens of each of the tags mentioned. My own tag I will designate by the letter "A", the other two types by "X" and "Y". The tabulated figures represent the stresses in pounds at which the tongue bases of the various tags noted, collapsed, or the clinched tongues themselves were pulled out of the eyelets.

| | | | | | | |
|---|---|---|---|---|---|---|
| A | 164 | 172 | 160 | 163 | 168 | 161 |
| X | 130 | 135 | 132 | 140 | 133 | 132 |
| Y | 95 | 98 | 104 | 108 | 99 | 111 |

While a specific embodiment of this invention is herein shown and described, it should be clearly understood that the detailed parts thereof may, or may not, appear in the preferred forms, and also that the preferred forms may be varied from time to time, depending upon the circumstances and conditions governing, and governed by, the development of this invention and the arts to which it is incident, so the interested inquirer is directed to interpret the scope of this invention from the claims, in which its spirit is broadly generalized.

Having fully described my invention, what I claim is:

1. In an ear tag having a main body portion adapted to be bent to an approximate U-shape with an eyelet at one extremity thereof, and a tongue with a base portion at the other end thereof, the combination with the tongue-base portion, of a centrally disposed buttress having a bottom face, the said buttress being adapted to have the said bottom face bear against the inside of the said body portion, when a compressive stress is applied to the tip of the said tongue.

2. In an ear tag comprising a body portion adapted to be bent into an approximate U-shape, one of the legs of the U having an eyelet in the extremity thereof, and a tongue portion located at the extremity of the other U-leg, the said tongue portion standing at approximately a right angle with the said second U-leg and adapted to register with the eyelet in the said first U-portion, the combination therewith, of a centrally disposed buttress having a bottom face formed in the said tongue portion, the said buttress being located in the space included within the said right angle, and being adapted to have its bottom face bear against the inside surface of the second U-leg when a compressive stress is applied to the top of the said tongue in a direction approximately in longitudinal alignment with the said buttress.

3. In an ear tag comprising a body portion adapted to be formed into a closed link having two longitudinal side-portions, one of the said side-portions, having a tongue-base portion standing at approximately a right angle to the respective side-portion, the combination therewith, of a buttress projecting inwardly from the said tongue-base portion, the said buttress being adapted to bear against the inner face of the respective side-portion.

4. In an ear tag made from a flat strip of material and comprising a body portion having a tongue-base portion at one end thereof with an eyelet portion at the other end; the combination therewith, of a buttress integrally formed in the said tongue-base portion, the said buttress having approximately the form of a half hollow cone, the base of the cone being adapted to bear against a face of the said body portion, for the purpose specified.

In testimony whereof, I sign my name hereto.

ARTHUR H. BERNTSON.